Patented Dec. 24, 1940

2,226,389

UNITED STATES PATENT OFFICE 2,226,389

NICOTINE INSECTICIDE AND METHOD OF MAKING THE SAME

Ray Riley, Long Island City, N. Y., assignor to The Permutit Company, New York, N. Y., a corporation of Delaware No Drawing. Application April 5, 1938, Serial No. 200,241

7 Claims. (Cl. 260—291)

This invention or discovery relates to nicotine insecticides and methods of making the same; and it comprises as an insecticide adapted for even application to plant leaves in readily visible form, as a dry powder or as a liquid spray, an insoluble black, carbonaceous ion-exchanging preparation in fine pulverulent form, characterized by carrying as the exchangeable part thereof, in fixed and insoluble form, a definite and substantial proportion of nicotine and by being denser than water, easily wetted and readily dispersible in water, resistant to heat and moisture, and of high nicotine concentration per unit volume and hence of high toxicity; and it further comprises a method of making such an insecticide including the steps of treating a black pulverulent carbonaceous ion-exchanging material having exchangeable ions with an aqueous solution of a nicotine salt until the preparation takes up a definite and large proportion of the nicotine ion and drying and pulverizing the thus treated preparation; all as more fully hereinafter set forth and as claimed.

Nicotine is a liquid alkaloid of high toxicity. It is volatile and has a relatively high vapor tension as a free base, rapidly evaporating in air. It occurs in tobacco, and is extracted therefrom by various methods, for use as a basis for insecticidal preparations, such as cattle dips, sprays for agricultural use, etc. Attempts have been made to devise dry nicotine preparations suitable for use as dusting powders, it often being more convenient and effective in practice to apply an insecticide as a powder than as a liquid. Liquid nicotine is taken up to a certain extent by various absorbent and adsorbent materials such as bentonite, certain clays, peat, etc., but it is not fixedly held in definite quantity in a form resistant to weather; in a form resisting evaporation and solution. Most of the prior attempts to make nicotine powders have been along the lines of taking up nicotine on such materials in powdered form. It is unfortunately impossible to get any great percentage of nicotine in such materials, at least in a stable and effective permanently retained form. While these nicotine powders have a certain effectiveness when fresh, they are not completely successful even when applied in large quantities and rapidly lose efficiency. An insect eating a leaf ordinarily takes in only a minute amount of adhering matter and unless the concentration of nicotine in this adhering matter is sufficiently large, the insect may not be killed. Moreover, bentonite, clay, etc., dusts do not remain very effectively on the leaf under the drastic weather conditions, heat, wind, rain and leaf friction which obtain in trees and other vegetation. In dusting a leaf with an insecticidal powder, the way in which the dust particle sticks to the leaf is quite as important as any other factor.

According to the present invention there is provided an improved pulverulent nicotine insecticide, capable of being applied to plants, either in liquid suspension as a spray, or as a dusting powder. In either case it clings and remains in plainly visible form. Uniformity of distribution can be followed by the eye. It is definite in composition, and has desirable mechanical properties as regards resistance to moisture and heat, and adherence to the leaf. It is easily wetted by water, and therefore readily incorporated in sprays. The same characteristic increases its efficacy as an insecticide. And even more important, it is of an exceptionally high permanent toxicity per unit volume, which means that a very small quantity is sufficient to kill an insect which eats it. The effective toxicity of insecticides which are to be eaten by insects goes up very rapidly with increase in poison concentration per unit volume.

The invention depends in large degree on the recent developments of certain carbonaceous zeolite-like materials, originally devised for use in water treatment, and having certain properties like those of the inorganic alumino-silicate zeolites formerly known, and other additional properties. Commercially these substances are known as carbonaceous zeolites and are on the market as hard, rigid black granules of a size adapting them for use in a pervious bed water softener. These new substances are made in various ways, for example, by treating lignite, coal, etc., with sulfuric acid under conditions producing highly insoluble granules of marked base exchange and ion exchange properties in general. Types of these new zeolites are described in United States patents, Nos. 2,205,635 and 2,206,007. Such materials are sometimes made by sulfating lignite, coal, wood or other carbonizable material, and are sometimes made by the action of powerful dehydrating agents on such materials; zinc chloride for example. They have many of the properties of ordinary synthetic mineral zeolites, such as ability to extract bases from water and to be regenerated with brine in repeated cycles, and they have additional properties, such as high acid resistance which allows them to be regenerated with acids, even with strong mineral acids.

According to the present invention in making a fine black permanent preparation adapted to cling to a leaf in easily visible form a substance of this type, usually in granular form, is first put in an acid condition by treatment with some mineral acid so as to give it the power of taking up cations. Or it is treated with brine or other salt solution containing an exchangeable base. The zeolite is then treated with an aqueous solution of a nicotine salt. Treatment is carried on to the point where the zeolite becomes saturated with chemically fixed nicotine. These carbon-zeolites have a selective action enabling them to abstract nicotine preferentially from impure aqueous solutions such as those obtained by steeping tobacco waste in water or acid. Such solutions can be used as the source of nicotine. On treating the zeolite granules with a nicotine sulfate solution, the granules take up nicotine base to a certain, quite definite amount, depending mostly on the exchange capacity of the zeolite. An extraordinarily large weight of nicotine can be taken up easily. Proportions of 11 per cent or more nicotine by weight in the dried material are readily obtained. The material, after steeping in the nicotine solution, is dried, either with or without washing, at room temperature or in an oven. The dried material is then pulverized, an operation readily performed. The powder is a black, highly toxic preparation of the advantages described. Because of the deep black color of the powder it is easy to obtain an even distribution of very small quantities on the leaf.

The process is simple and economical. Treatment of the zeolite with the various liquids is by simple percolation. No soluble nicotine products appear to be formed. That is, upon percolating a nicotine solution through the zeolites, all the nicotine is taken up and fixedly held, until the point of saturation is reached; and the nicotine is held in highly insoluble form. Using a salt of nicotine, such as sulfate, and a carbonaceous zeolite holding sodium as a cation the action is one of base exchange, analogous to the sodium-calcium exchange in ordinary zeolite water softening, in that the nicotine is taken up in definite amount and fixed in insoluble condition, just as calcium is taken up in softening water. In the event that the carbon zeolite is preliminarily treated with acid and is then charged with a solution containing a nicotine salt, the action is analogous to that in removing bases from water with the aid of carbon zeolites.

In an example of a specific embodiment of a process within the purview of the present invention, a batch of 20 kilograms of a carbonaceous zeolite, of granule size 10–40 mesh, was immersed for 16 hours in 100 liters of normal HCl to convert it completely to the acid condition, and was washed. The washed material was immersed for two hours in a 0.2 N nicotine sulfate solution containing 4.9 kgm. nicotine calculated as free base. At the end of this time the liquor surrounding the granules was largely a weak sulfuric acid solution, containing some excess nicotine. The material was then washed, and dried in air and pulverized to finer than 200 or 300 mesh; a fineness appropriate for use as a dusting powder.

Set forth below are data on the nicotine content of the preparation, from measurements made on samples of the nicotine-charged granules after pulverization:

| | |
|---|---|
| Average nicotine content (as free base) ____________per cent by weight__ | 11.4 |
| Average weight of 100 cc. of a bed of the 10–40 mesh material, in wet condition____________grams__ | 55 |
| Weight of nicotine per 100 cc. of the preparation ____________do____ | 6.3 |

While the apparent density of the wet granules before pulverization is only 0.55 gram per cc., the granules sink in water, indicating a real density of more than 1 gram per cc.

(2) In another example, a batch of 22 kgm. of a 10–40 mesh carbonaceous zeolite was treated with normal HCl in excess, to insure complete conversion to the acid condition. The material was washed and was disposed in the form of a bed in a suitable container and 2100 liters of 0.015 N nicotine sulfate solution (5.1 kgm. of nicotine) were percolated therethrough at a flow rate of 10 liters per minute, at room temperature. About 1400 liters of the solution passed through before nicotine began to appear in the effluent from the bed, in any substantial quantity (i. e. more than 10 parts per million). The nicotine-charged granules were then dried in air at room temperature, and were ground to a fine powder.

Following are data on the product:

| | |
|---|---|
| Per cent nicotine by weight (various samples)____ | 11.5 to 14.8 (average 12.4). |
| Weight of nicotine per 100 cc. material ________ | 6.8 grams. |
| Apparent density__ | Same as in Example 1. |

(3) In a third example, the carbonaceous zeolite was initially steeped in an excess of a normal NaCl solution (weak brine) in lieu of a normal HCl solution, the rest of the process being carried out as in Example 2. The average nicotine content was about the same as in Example 2.

In all the cases the nicotine contents were determined by the U. S. Official Method: Assoc. Official Agr. Chem., Methods of Analysis, third edition, 1930.

(4) Tobacco was steeped in water to obtain a solution containing nicotine in dilution about 0.0075 N. The solution also contained other solubles incidentally leached from the tobacco. An acid washed granular carbonaceous zeolite was treated with this solution to saturation, at 60° C. The granules were washed, dried and pulverized. The dried granules contained about 7 per cent nicotine by weight, or about 3.5 grams nicotine in 100 cc. of the preparation; and about an equal weight of other substances taken up from the tobacco steepings.

While in most cases the granules are washed prior to drying and pulverization, this step can be omitted if desired.

The preparations are usually made to contain nicotine in proportions corresponding to at least 3 grams nicotine in 100 cc.

These carbonaceous zeolites have a definite capacity for nicotine, corresponding to the ultimate exchange capacity of the zeolite as measured for Na, Ca, etc., and standardized insecticide preparations of various desired potencies can be manufactured, within close limits. The process readily lends itself to large scale commercial operation. The zeolite granules, being denser than water, can be treated with the various liquids by percolation, which is probably the best and simplest possible method of charging the granules with the nicotine. The granules can be readily pulverized to fine powders of desirable character.

The new preparation is, as stated, remarkably stable to heat and moisture. Upon heating a sample of the preparation for three hours at 100° C. there was negligible loss of nicotine, which indicates that the nicotine is fixed in highly non-volatile form. In a test showing the remarkable non-volatility and insolubility of the nicotine content of the preparation, a sample of the preparation containing 11.5 per cent nicotine was maintained 8 hours at a temperature of 50–60° C., and then immersed in water for 16 hours; the alternating treatments being continued for 10 days. At the end of this time, the nicotine content was still 9.3 per cent, the loss being some 20 per cent. The conditions obtaining in this test are of course much more drastic than would occur in any normal utilization of the product for its intended purposes.

The high insolubility and non-volatility of the nicotine preparation make for markedly greater safety in handling and use than with prior preparations.

What I claim is:

1. An insecticide comprising finely divided insoluble carbonaceous ion-exchange material prepared by reacting carbonizable material with a concentrated dehydrating agent and carrying nicotine as the exchangeable part thereof, in insoluble and non-volatile form, the particles of said preparation being black, clinging to leaves, being denser than water, and being stable as regards heat and moisture, the concentration of nicotine being at least about 3 grams per 100 cc. of a mass of wet particles.

2. An insecticide comprising finely divided insoluble black carbonaceous ion-exchange material prepared by reacting carbonizable material with a concentrated dehydrating agent are carrying nicotine in insoluble, exchangeable form, the amount of nicotine corresponding to at least about 7 per cent by weight and to the proportion of 3 grams per 100 cc. of a mass of wet particles.

3. An insecticide comprising an insoluble black synthetic carbonaceous ion-exchange product as a finely divided preparation denser than water, stable to heat and moisture and carrying nicotine in the exchangeable part thereof in insoluble form; the carbonaceous product being the reaction product of carbonaceous material and a concentrated powerful dehydrating agent at elevated temperatures.

4. An insecticide comprising an insoluble solid, black sulfated carbonaceous material of ion-exchanging character, carrying nicotine in the exchangeable part thereof in insoluble form, the nicotine content being stable and substantially non-volatile under the action of heat and moisture.

5. An insecticide comprising an insoluble solid black synthetic sulfated carbonaceous material having a high capacity for ion-exchange carrying exchangeable nicotine and characterized by carrying the nicotine in such form as to resist loss by volatilization when heated.

6. The insecticide of claim 5 wherein the proportion of nicotine corresponds to at least about 3 grams per 100 cc. of the preparation.

7. A method of making an insecticide which comprises passing an aqueous extract of tobacco through a bed of an insoluble solid, synthetic, sulfated carbonaceous substance having a high capacity for ion exchange and containing exchangeable ions until a definite quantity of nicotine is taken up by the substance in insoluble form in exchange for the ions therein, drying the nicotine-charged substance and pulverizing it.

RAY RILEY

CERTIFICATE OF CORRECTION.

Patent No. 2,226,389. December 24, 1940.

RAY RILEY.

It is hereby certified that error appears in the printed specification of the above numbered patent requiring correction as follows: Page 3, second column, line 3, claim 2, for the word "are" read --and--; and that the said Letters Patent should be read with this correction therein that the same may conform to the record of the case in the Patent Office.

Signed and sealed this 11th day of February, A. D. 1941.

(Seal)

Henry Van Arsdale,
Acting Commissioner of Patents.